Patented May 3, 1927.

1,626,623

UNITED STATES PATENT OFFICE.

GEORGE S. MORGAN, OF TOLEDO, OHIO.

PROCESS OF REMOVING DETERRENT SALTS FROM PICKLING LIQUORS.

No Drawing.   Application filed June 30, 1926. Serial No. 119,747.

My invention has for its object to provide a process for removing the iron salt or compound from pickling liquor which is produced in the pickling of iron and restoring it to its original rust removing effectiveness.

As is well known in connection with iron pickling process sulphuric acid is used to remove the rust. This produces ferrous sulphate in the acid solution by the action of the sulphuric acid in the pickling liquor until the acid solution becomes overcharged with the ferrous sulphate. Heretofore the acid of the exhausted or salt charged pickling solutions has been neutralized and dumped into rivers or other bodies of water to the damage of the surrounding country or efforts have been made to recover the acid and remove the ferrous sulphate by evaporation or freezing. Such recovery processes can only be carried out at a large expense.

By my invention the exhausted pickling solution is restored by removal of the ferrous sulphate.

Processes containing my invention may be varied as to the steps taken and as to the proportion of the elements of ingredients that are treated or are added to the solution of mixture, in connection with which the process containing my invention, is performed. A preferred form of a process containing my invention is selected as an example of such process and is described hereinafter.

The invention primarily has for its objects to enable the use of all of the sulphuric acid introduced in pickling solutions and to recover the ferrous sulphate produced by the action of the acid on the rust. This is done by the precipitation of the ferrous sulphate by the use of a solution of sulphuric acid. The solution is increased in its acid content until the concentration is from 35% to 50%.

Fresh pickling liquor for removing rust is usually water acidified with 6% to 10% sulphuric acid and is used until the ferrous sulphate that is formed by the action of the acid on the ferrous oxide amounts to about 5% to 15% of the solution, and the free acid is reduced to 1% to 5% of the solution. Usually the solution is considered exhausted when the ferrous sulphate amounts to about 12% and the acid is about 3%. In order to restore the exhausted solution a considerable amount of acid is added to the solution to cause a precipitation of the ferrous sulphate. Preferably enough acid is added to make a 50% solution by weight. As for example, to 100 pounds of pickling liquor about 100 pounds of acid at about 66 degree Baumé, or its equivalent in any strong sulphuric acid is used, that is, a greater weight of the acid will be used where the specific gravity is less. This causes practically all of the ferrous sulphate to precipitate in a white anhydrous form.

As to the acidity of the solution where it is changed from the 3% to 50% a slight cloudy effect will begin to form when the acid solution becomes a 35% solution and the ferrrous sulphate begins to come down very noticeably at slightly above 35%. Practically all the ferrous sulphate will be precipitated when the acidity reaches that of a 50% solution.

The precipitate is allowed to settle and the clear acidified liquor is run off having practically no ferrous sulphate dissolved therein at least not to exceed 1% where a 50% acid solution is formed. The ferrous sulphate contained in the solution will not ordinarily exceed a very small fraction of 1% of the solution.

The 35% to 50%, or thereabout acid solution that is drawn from the precipitate may be stored for further use, or water may be added thereto to reduce the acid content to about 10% and the solution used for pickling purposes until the solution is exhausted, that is, until the acid content is reduced to about 3%, and the solution contains about 12% of ferrous sulphate. Thus in a continuous use of the pickling solution all of the acid is consumed to form the ferrous sulphate which is separated from the pickling liquor as described.

When the 35% to 50% acidified water is drawn from the precipitated ferrous sulphate, the ferrous sulphate will hold some of the acid mechanically mixed therewith and a paste like material is formed. The paste like material is placed on a suitable vacuum filter to hasten the separation of the precipitate from the liquor mechanically mixed therewith.

Also the precipitated ferrous sulphate is preferably washed with an exhausted portion of the pickling liquor, that is, pickling liquor that has ferrous sulphate to a concentrated degree and is low in acid, to remove the excess acid mechanically mixed with the precipitate. Since the pickling liquor with which a precipitate is washed is low in acid and high in ferrous sulphate but little of the precipitate will be dissolved. The precipitate that is left may be dried and used for any purpose for which anhydrous ferrous sulphate may be used.

If on the other hand it is desired to form the water crystals of ferrous sulphate and at the same time remove the acid that may be mechanically combined therewith after the more or less concentrated acid solution is drawn off, it may be done by dumping the precipitate into hot or boiling exhausted pickling liquor which will dissolve the ferrous sulphate. This is then allowed to cool when the copperas will crystallize out. Thus not only the ferrous sulphate that was introduced into the solution is removed, but also some of the ferrous sulphate that was contained in the solution into which the precipitate was dumped is also removed.

The mother liquor may be drawn off from the copperas and used for dissolving more of the precipitate until its acid content reaches about 20%. The process may be conducted continuously, that is, by a continuous flow of the solutions and if desired storage of portions thereof.

I claim:

The process of removing deterrent salts from pickling solutions for iron which consists in precipitating the iron sulphate by adding sulphuric acid to the solution until the acid content amounts to about 35% to 50% of the solution, drawing off the liquor and dissolving the precipitate in hot exhausted pickling liquor, cooling the solution to form copperas.

In testimony whereof I have hereunto signed my name to this specification.

GEORGE S. MORGAN.